(12) United States Patent
Ren et al.

(10) Patent No.: US 11,529,733 B2
(45) Date of Patent: Dec. 20, 2022

(54) METHOD AND SYSTEM FOR ROBOT ACTION IMITATION LEARNING IN THREE-DIMENSIONAL SPACE

(71) Applicant: Hefei University of Technology, Anhui (CN)

(72) Inventors: Minglun Ren, Anhui (CN); Yuanyuan Ma, Anhui (CN)

(73) Assignee: Hefei University of Technology, Hefei (CN)

( * ) Notice: Subject to any disclaimer, the term of this patent is extended or adjusted under 35 U.S.C. 154(b) by 255 days.

(21) Appl. No.: 17/068,864

(22) Filed: Oct. 13, 2020

(65) Prior Publication Data
US 2021/0299860 A1 Sep. 30, 2021

(30) Foreign Application Priority Data

Oct. 15, 2019 (CN) .......................... 201910976460.0

(51) Int. Cl.
 *B25J 9/16* (2006.01)
 *B25J 13/08* (2006.01)
(52) U.S. Cl.
 CPC ............... *B25J 9/163* (2013.01); *B25J 9/161* (2013.01); *B25J 9/1607* (2013.01); *B25J 9/1653* (2013.01); *B25J 9/1664* (2013.01); *B25J 13/088* (2013.01)
(58) Field of Classification Search
 CPC . B25J 9/163; B25J 9/1607; B25J 9/161; B25J 9/1653; B25J 9/1664; B25J 13/088; B25J 9/1602; G05B 19/42
(Continued)

(56) References Cited

U.S. PATENT DOCUMENTS 5,280,265 A * 1/1994 Kramer .................. G09B 21/04
 600/595
5,371,834 A * 12/1994 Tawel .................. G06K 9/6251
 706/23
(Continued)

OTHER PUBLICATIONS

J. -C. Park, D. -S. Kim and Y. Nagai, "Learning for Goal-Directed Actions Using RNNPB: Developmental Change of "What to Imitate"," in IEEE Transactions on Cognitive and Developmental Systems, vol. 10, No. 3, pp. 545-556, Sep. 2018, doi: 10.1109/TCDS.2017.2679765. (Year: 2018).*

*Primary Examiner* — Jaime Figueroa
(74) *Attorney, Agent, or Firm* — Wolter Van Dyke Davis PLLC; Erica M Cipparone

(57) ABSTRACT

The present invention provides a method for robot action imitation learning in a three-dimensional space and a system thereof, relates to the technical fields of artificial intelligence and robots. A method based on a series-parallel multi-layer backpropagation (BP) neural network is designed for robot action imitation learning in a three-dimensional space, which applies an imitation learning mechanism to a robot learning system, under the framework of the imitation learning mechanism, to train and learn by transmitting demonstrative information generated from a mechanical arm to the series-parallel multi-layer BP neural network representing a motion strategy. The correspondence between a state characteristic matrix set of the motion and an action characteristic matrix set of the motion is learned, to reproduce the demonstrative action, and generalize the actions and behaviors, so that when facing different tasks, the method does not need to carry out action planning separately, thereby achieving high intelligence.

10 Claims, 6 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 5,648,709 | A * | 7/1997 | Maeda | G05B 17/02 700/262 |
| 5,673,367 | A * | 9/1997 | Buckley | B25J 9/1612 706/23 |
| 6,169,981 | B1 * | 1/2001 | Werbos | G05B 13/0285 706/26 |
| 6,581,048 | B1 * | 6/2003 | Werbos | G06N 3/105 250/369 |
| 8,145,492 | B2 * | 3/2012 | Fujita | G10L 15/16 704/235 |
| 8,719,212 | B2 * | 5/2014 | Khoukhi | B25J 9/1664 701/1 |
| 9,269,043 | B2 * | 2/2016 | Nugent | G06N 3/049 |
| 10,504,033 | B1 * | 12/2019 | King | G06N 10/00 |
| 10,839,302 | B2 * | 11/2020 | Wright | G05B 13/0265 |
| 10,919,152 | B1 * | 2/2021 | Kalouche | B25J 9/1697 |
| 11,113,959 | B2 * | 9/2021 | Alam | G08G 1/0141 |
| 11,369,879 | B2 * | 6/2022 | Juliani, Jr. | G06K 9/6256 |
| 2005/0240412 | A1 * | 10/2005 | Fujita | G10L 15/16 704/E15.017 |
| 2008/0243307 | A1 * | 10/2008 | Toussaint | B25J 9/1664 901/30 |
| 2012/0290131 | A1 * | 11/2012 | Khoukhi | B25J 9/1623 700/250 |
| 2014/0156576 | A1 * | 6/2014 | Nugent | G06N 3/049 706/25 |
| 2017/0213151 | A1 * | 7/2017 | Uchibe | G06N 7/005 |
| 2017/0228662 | A1 * | 8/2017 | Gu | G06N 3/0427 |
| 2018/0012137 | A1 * | 1/2018 | Wright | G05B 13/0265 |
| 2018/0157973 | A1 * | 6/2018 | El-Yaniv | G06N 3/0454 |
| 2019/0184561 | A1 * | 6/2019 | Yip | G06N 5/046 |
| 2019/0314984 | A1 * | 10/2019 | Gonzalez Aguirre | B25J 9/1661 |
| 2020/0039067 | A1 * | 2/2020 | Jeong | G06N 20/00 |
| 2020/0042874 | A1 * | 2/2020 | Rohanimanesh | G06N 3/0472 |
| 2020/0122040 | A1 * | 4/2020 | Juliani, Jr. | A63F 13/35 |
| 2020/0175411 | A1 * | 6/2020 | King | G06N 20/20 |
| 2020/0276703 | A1 * | 9/2020 | Chebotar | G05B 13/0205 |
| 2021/0031364 | A1 * | 2/2021 | Groz | B25J 9/163 |
| 2021/0038167 | A1 * | 2/2021 | Martineau | A61B 5/1128 |
| 2021/0205986 | A1 * | 7/2021 | Kalouche | B25J 9/163 |
| 2021/0248514 | A1 * | 8/2021 | Cella | G06Q 30/0278 |

* cited by examiner dividing a three-dimensional motion space based on a workspace requirement of a robot mechanical arm; obtaining mechanical arm joint angle state information, end position state information and characteristic information in the three-dimensional motion space during demonstration;

setting up a mechanical arm system state space model based on the mechanical arm joint angle state information and end position state information;

obtaining a state characteristic matrix set and an action characteristic matrix set of mechanical arm motion based on the mechanical arm system state space model and characteristic information;

obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;

obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation

FIG. 1

METHOD AND SYSTEM FOR ROBOT ACTION IMITATION LEARNING IN THREE-DIMENSIONAL SPACE

TECHNICAL FIELD

The present disclosure relates to the technical field of artificial intelligence, in particular to a method for robot action imitation learning in a three-dimensional space and a system thereof.

BACKGROUND

The demand for service robots, especially home service robots, has been growing rapidly in recent years with the development of the times, the spread of artificial intelligence and the increasing demand for quality of life. Service robots face complex working environments and share three-dimensional space with humans; more importantly, these robots serve a much larger population of non-specialists.

At present, the research on robot actions imitation learning in a three-dimensional space mainly includes two phases: the first phase is how to demonstrate and collect demonstrative cases; the second phases is how to obtain strategies from the demonstrative cases and determine what kind of strategies to learn. In the prior art, the first phase is mainly in the form of "hands-on" learning; and the second phase is to learn a state-to-action mapping strategy and learn a reward function to obtain the motion strategy.

However, some of the methods used to learn the state-to-action mapping strategy are difficult to apply to motion learning in 3D spatially redundant mechanical arms; the methods used to learn the reward function separate each skill, and hence learning one skill does not enhance the learning of other skills. The result is that existing robots are less intelligent in terms of actions imitation learning in three-dimensional space.

SUMMARY OF PARTICULAR EMBODIMENTS

(1) Technical Problem to be Solved

In view of the drawbacks of the prior art, the present disclosure provides a method for robot action imitation learning in a three-dimensional space and a system thereof, solving the technical problem in the prior art that robots are less intelligent in terms of actions imitation learning in three-dimensional space.

(2) Technical Solution

In order to achieve the above object, the present disclosure provides the following technical solutions:

A method for robot action imitation learning in a three-dimensional space comprises:

dividing a three-dimensional space based on a workspace requirement of a robot mechanical arm; obtaining mechanical arm joint angle state information, end position state information and characteristic information in the three-dimensional space during demonstration;

setting up a mechanical arm system state space model based on the mechanical arm joint angle state information and end position state information;

obtaining a state characteristic matrix set and an action characteristic matrix set of mechanical arm motion based on the mechanical arm system state space model and characteristic information;

obtaining a series-parallel multi-layer BP neural network model for action imitation learning based on the state characteristic matrix set of mechanical arm motion, the action characteristic matrix set of mechanical arm motion and a pre-built series-parallel multi-layer BP neural network model;

obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation.

Preferably, the characteristic information comprises: mechanical arm system state characteristic information, and task-related environment information;

the mechanical arm system state characteristic information comprises: angle state information of each current joint angle of the mechanical arm, and position state information of an end point of the mechanical arm;

the task-related environment information comprises: position state information of a demonstrative-task target point in a spatial coordinate system.

Preferably, the method further comprises, before the obtaining a state characteristic matrix set and an action characteristic matrix set of mechanical arm motion:

constructing a characteristic matrix set with selected characteristic parameters from the task-related characteristic information, and preprocessing the characteristic matrix set.

Preferably, the task-related characteristic information comprises: mechanical arm system state characteristic information and environment state characteristic information; the mechanical arm system state characteristic information comprises: angle state characteristic $\theta_{ij}$ of each current joint angle of the mechanical arm, and position state characteristic $S_k$ of the end point of the mechanical arm; the environment state characteristic information comprises: position state characteristic $G_k$ of a demonstrative-task target point, where $G_k$ denotes the coordinate of the demonstrative-task target point G in direction k.

Preferably, the preprocessing includes:

calculating an action characteristic parameter of the mechanical arm according to the equation below:

$$\alpha_{ijt} = \theta_{ijt+1} - \theta_{ijt}$$

Where $\theta_{ijt+1}$ is the angle of a joint angle i in the direction j at time t+1, $\theta_{ijt}$ is the angle of the joint angle i in the direction j at time t, $\alpha_{ijt}$ is the angle that the joint angle i rotates in the direction j at time t;

calculating a state characteristic parameter of the mechanical arm relative to a target point according to the equation below:

$$D_{kt} = S_{kt} - G_{kt}$$

Where $S_{kt}$ is the coordinate of the end point S of the mechanical arm in the direction k at time t, $G_{kt}$ is the coordinate of the target point G in the direction k at time t, $D_{kt}$ is the relative displacement of the end point S of the mechanical arm with respect to the target point G in the direction k at time t.

Preferably, the pre-built series-parallel multi-layer BP neural network model comprises an input layer, a hidden layer and an output layer;

the input layer contains S nodes, the output layer contains T nodes and the hidden layer contains C nodes; the number of hidden-layer nodes is calculated according to the equation below:

$$C = \lceil \sqrt{S+T} + a \rceil$$

where a is an adjustment constant, $0 \leq a \leq 10$; and $\lceil \cdot \rceil$ is a round-down function.

Preferably, the obtaining a series-parallel multi-layer BP neural network model for action imitation learning comprises:

S401. obtaining input state samples $X=[X_1, X_2, \ldots X_n, \ldots, X_N]$ and expected output action samples $Y=[Y_1, Y_2, \ldots Y_n, \ldots, Y_N]$ at a corresponding time from the state characteristic matrix set and the action characteristic matrix set, where X is an nth input sample, and the nth input sample $X_n$ matrix contains P joint angle state parameters and Q relative displacement state parameters, totaling L parameters, denoted as $X_n=[x_1^n, x_2^n, \ldots, x_l^n, \ldots, x_L^n]^T$, where $x_l^n$ is an lth input parameter of the nth input sample; $Y_n$ is the expected output action result sample for the nth input sample $X_n$, $Y_n$ contains P joint angle of rotation action result parameters, denoted as $Y_n=[y_1^n, y_2^n, L, y_p^n, L, y_P^n]^T$, where $Y_p^n$ is a pth expected output result parameter for the nth sample, $1 \leq n \leq N$;

S402. randomly selecting k input samples $(X_1, X_2, X_3, \ldots, X_k)$ from the samples, as the input samples for an mth training, where m is the number of trainings and is initialized as m=1;

S403. obtaining an output value up of a pth node in the hidden layer of a kth training sample in the mth training according to the equation below, to obtain a hidden-layer node output value matrix $u_k=[u_1^k, u_2^k, \ldots, u_p^k, \ldots, u_S^k]$ of the kth training sample in the mth training:

$$u_p^k = \omega_p^m \times X_k^T$$

where $\omega_p^m$ is a link weight coefficient matrix in the mth training between the pth node in the hidden layer and S starting nodes in the input layer, $\omega_p^m=[\omega_{p1}^m, \omega_{p2}^m, \ldots, \omega_{pj}^m, \ldots, \omega_{pS}^m]$; $\omega_{pj}^m$ denotes a link weight coefficient in the mth training between a jth input-layer node and the pth hidden-layer node; $X_k^T$ is the transpose of the kth training sample;

S404. calculating an output value $y_q^k$ of a qth node in the output layer of the kth training sample in the mth training according to the equation blow, to obtain an output-layer node output value matrix $y_k=[y_1^k, y_2^k, \ldots, y_q^k, \ldots, y_T^k]$ of the kth training sample in the mth training:

$$y_q^k = a^m + \lambda_q^m \times u_k^T + \varphi_q^m \times X_k^T$$

where $a^m$ is a bias term matrix of q nodes in the output layer in the mth training, $a^m=[a_1^m, a_2^m, \ldots, a_q^m, \ldots, a_T^m]^T$; $\lambda_q^m$ is a link weight coefficient matrix in the mth training between the qth node in the output layer and C nodes in the hidden layer, $\lambda_q^m=[\lambda_{q1}^m, \lambda_{q2}^m, \ldots, \lambda_{qp}^m, \ldots, \lambda_{qC}^m]$; $\lambda_{qp}^m$ denotes a link weight coefficient in the mth training between a pth hidden-layer node and the qth output-layer node; $\varphi_q^m$ is a link weight coefficient matrix in the mth training between the qth node in the output layer and S nodes in the input layer, $\varphi_q^m=[\varphi_{q1}^m, \varphi_{q2}^m, \ldots, \varphi_{qj}^m, \ldots, \varphi_{qS}^m]$; $\varphi_{qj}^m$ denotes a link weight coefficient in the mth training between a jth input-layer node and the qth output-layer node; $X_k^T$ is the transpose of the kth training sample;

S405. calculating a mean-square error (MSE) between output results of the output-layer nodes in the mth training and expected output results of an mth group of input samples $(X_1, X_2, X_3, \ldots, X_k)$ according to the equation below:

$$MSE = \frac{1}{C}\frac{1}{k}\sum_{k=1}^{k}\sum_{i=1}^{C}(Y_i'^k - Y_i^k)^2$$

where

C denotes the number of output nodes, k denotes the number of training samples, $Y_i'^k$ denotes the actual output value, $Y_i^k$ denotes the expected output;

S406. if $MSE_m > \varepsilon$, where $\varepsilon$ is a specified error accuracy, maintaining the link weight coefficients and bias terms, and executing step S407; otherwise, step S408;

S407. correcting the link weight coefficients and bias terms, to obtain a corrected link weight coefficient $\omega'^m_{pj}$ between a pth hidden-layer node and a jth input-layer node in the mth training, a corrected link weight coefficient $\lambda'^m_{qp}$ between a qth output-layer node and a pth hidden-layer node in the mth training, a corrected link weight coefficient $\varphi'^m_{qj}$ between a qth output-layer node and a jth input-layer node in the mth training, a corrected bias term $a'^m_q$ between a qth output-layer node and the hidden-layer nodes in the mth training, where the correction is done according to the equation below:

$$\begin{cases} \omega'^m_{pj} = \omega^m_{pj} - \rho\alpha\frac{\partial E_m}{\partial w^m_{pj}} \\ \lambda'^m_{qp} = \lambda^m_{qp} - \rho\beta\frac{\partial E_m}{\partial \lambda^m_{qp}} \\ \varphi'^m_{qj} = \varphi^m_{qj} - \rho\gamma\frac{\partial E_m}{\partial \varphi^m_{qj}} \\ a'^m_q = a^m_q - \rho\delta\frac{\partial E_m}{\partial a^m_q} \end{cases}$$

where $\alpha$, $\beta$, $\gamma$ and $\delta$ are learning strides, and $\rho$ is a stride coefficient;

the stride coefficient is calculated according to the equation below:

$$\begin{cases} \rho = 1 & \varepsilon \leq E_n < 2\varepsilon \\ \rho = \frac{E_n}{\varepsilon} & 2\varepsilon \leq E_n < 10\varepsilon \\ \rho = 10 & 10\varepsilon \leq E_n \end{cases};$$

S408. assigning $\omega'^m_{pj}$ to $\omega^m_{pj}$; assigning to $\lambda'^m_{qp}$; assigning $\varphi'^m_{qj}$ to $\varphi^m_{qj}$; assigning $a'^m_q$ to $a^m_q$;

S409. assigning m+1 to m, and judging whether m>M, where M is a specified number of training iterations, if so, determining that optimal link weight coefficients $\omega^*_{pj}$, $\lambda^*_{qp}$ and $\varphi^*_{qj}$ and bias term $a^*_q$ are obtained; otherwise, returning to step S404;

S410. substituting with the optimal link weight coefficients and bias term in the equations in steps S403 and S404, and combining the equation for calculating the number of hidden-layer nodes, to obtain the series-parallel multi-layer BP neural network model:

$$C = \lceil \sqrt{S+T} + a \rceil$$

$$u_p^k = \omega_{pj}^* \times X_k^T$$

$$y_q^k = a_q^* + \lambda_{qp}^* \times u_k^T + \varphi_{qj}^* \times X_k^T$$

where

C is the number of hidden-layer nodes, T is the number of output-layer nodes, S is the number of input-layer nodes;

a is an adjustment constant, $0 \le a \le 10$;

$\lceil \cdot \rceil$ is a round-down function;

$u_p^k$ is an output value of a pth node in the hidden layer;

$y_q^k$ is an output value of a qth node in the output layer;

$\omega_{pj}^*$, $\lambda_{qp}^*$ and $\varphi_{qj}^*$ are the optimal link weight coefficients;

$a_q^*$ is the bias term;

$X_k^T$ is the transpose of a kth training sample.

Preferably, the obtaining a state characteristic matrix set of mechanical arm motion for a real-time target task comprises:

obtaining in real time mechanical arm current state information and environment state information, extracting a mechanical arm angle characteristic from the mechanical arm state information, and distance characteristic information of the end point of the mechanical arm to the target point in the environmental state information, to obtain the state characteristic matrix set of mechanical arm motion for a real-time target task.

Preferably, the method further comprises, after the executing an action defined by the action characteristic matrix set: determine whether the mechanical arm completes the target task; the determination comprises:

calculating a displacement between the end point of the mechanical arm and the target point in the current state, according to the equation below:

$$DT = \sqrt{D_x^2 + D_y^2 + D_z^2}$$

Where $D_x$, $D_y$, $D_z$ are relative displacements of the end point of the mechanical arm with respect to the target point in the directions x, y and z, respectively; DT is the displacement between the end point of the mechanical arm and the target point in the current state;

comparing DT with a predetermined error accuracy $\psi$, if $DT \le \psi$, determining the target task is completed; if $DT > \psi$, determining the task is not completed; when the task is not completed, re-obtaining a state characteristic matrix set of mechanical arm motion for the real-time target task.

The present disclosure also provides a system for robot action imitation learning in a three-dimensional space, the system comprising a computer, the computer comprising:

at least one storage unit;

at least one processing unit;

wherein the at least one storage unit is stored with at least one instruction, the at least one instruction is loadable and executable by the at least one processing unit to implement the steps of:

dividing a three-dimensional space based on a workspace requirement of a robot mechanical arm; obtaining mechanical arm joint angle state information, end position state information and characteristic information in the three-dimensional space during demonstration;

setting up a mechanical arm system state space model based on the mechanical arm joint angle state information and end position state information;

obtaining a state characteristic matrix set and an action characteristic matrix set of mechanical arm motion based on the mechanical arm system state space model and characteristic information;

obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;

obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task.

(3) Beneficial Effects

The present disclosure provides a method for robot action imitation learning in a three-dimensional space and a system thereof. Compared with the prior art, the present disclosure can produce the following beneficial effects:

The present disclosure includes first dividing a three-dimensional space based on a workspace requirement of a robot mechanical arm; obtaining mechanical arm joint angle state information, end position state information and characteristic information in the three-dimensional space during demonstration; then setting up a mechanical arm system state space model based on the mechanical arm joint angle state information and end position state information; obtaining a state characteristic matrix set and an action characteristic matrix set of mechanical arm motion based on the mechanical arm system state space model and characteristic information; obtaining a series-parallel multi-layer BP neural network model for action imitation learning based on the state characteristic matrix set of mechanical arm motion, the action characteristic matrix set of mechanical arm motion and a pre-built series-parallel multi-layer BP neural network model; and finally obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation. In the present disclosure, a method based on a series-parallel multi-layer BP neural network is designed for robot action imitation learning in a three-dimensional space, which applies an imitation learning mechanism to a robot learning system, under the framework of the imitation learning mechanism, to train and learn by transmitting demonstrative information generated from a mechanical arm to the series-parallel multi-layer BP neural network representing a motion strategy. The correspondence between a state characteristic matrix set of the motion and an action characteristic matrix set of the motion is learned, to reproduce the demonstrative action, and generalize the actions and behaviors, so that when facing different tasks, the method does not need to carry out action planning separately, thereby achieving high intelligence.

BRIEF DESCRIPTION OF THE DRAWINGS

In order to illustrate more clearly the embodiments of the present disclosure or the technical solutions in the prior art, accompanying drawings to be used in the description of the embodiments and the prior art will be briefly described hereinafter. As a matter of course, the drawings are only some examples of the embodiments of the present invention; those skilled in the art understand that other drawings can be obtained based on these drawings without inventive effort.

FIG. 1 is a block diagram of a method for robot action imitation learning in a three-dimensional space according to an embodiment of the present disclosure;

DETAILED DESCRIPTION OF PARTICULAR EMBODIMENTS

Figure 2:
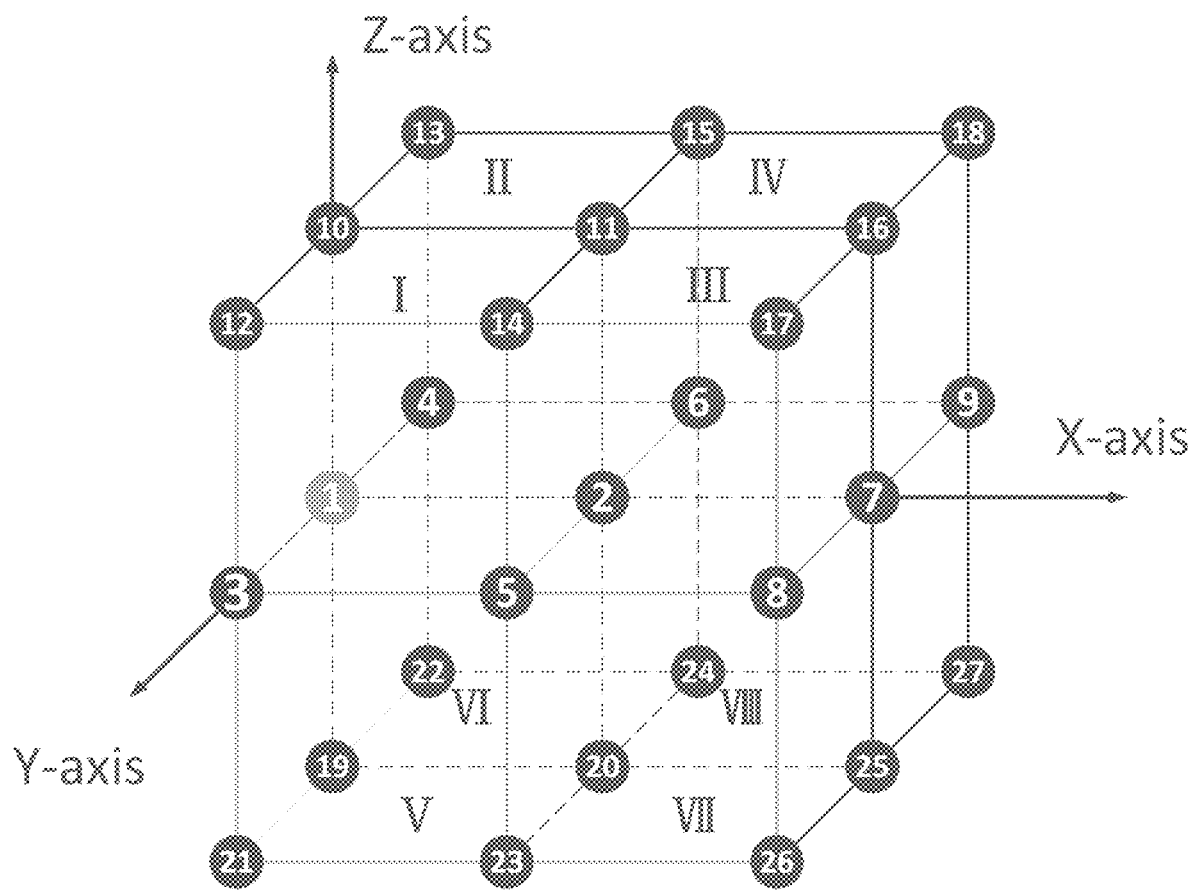
FIG. 2 is a schematic diagram of the division of a three-dimensional space according to an embodiment of the present disclosure.

In order to make clearer the objects, technical solutions and advantages of the embodiments of the present disclosure, the technical solutions in the embodiments will be described clearly and fully. As a matter of course, the embodiments described herein are merely some examples of the present invention; any other embodiment obtained by those skilled in the art based on the embodiments of the present disclosure without inventive effort shall fall within the scope of protection of the present invention.

The embodiments of the present disclosure provide a method for robot action imitation learning in a three-dimensional space and a system thereof, solving the technical problem in the prior art that robots are less intelligent in terms of actions imitation learning in three-dimensional space, and improving the intelligence of robots in actions imitation learning in three-dimensional space.

In order to solve the above technical problem, the technical solutions in the embodiments of the present disclosure have a general idea as follows:

A method based on a series-parallel multi-layer backpropagation (BP) neural network is designed for robot action imitation learning in a three-dimensional space, which applies an imitation learning mechanism to a robot learning system, under the framework of the imitation learning mechanism, to train and learn by transmitting demonstrative information generated from a mechanical arm to the series-parallel multi-layer BP neural network representing a motion strategy. The correspondence between a state characteristic matrix set of the motion and an action characteristic matrix set of the motion is learned, to reproduce the demonstrative action, and generalize the actions and behaviors, so that when facing different tasks, the method does not need to carry out action planning separately, thereby achieving high intelligence.

In order to better understand the above technical solutions, the technical solutions will be described in detail in conjunction with the accompanying drawings and specific implementations.

The present disclosure provides a method for robot action imitation learning in a three-dimensional space as shown in FIG. 1, including steps S1 to S5:

S1. dividing a three-dimensional space based on a workspace requirement of a robot mechanical arm; obtaining mechanical arm joint angle state information, end position state information and characteristic information in the three-dimensional space during demonstration;

S2, setting up a mechanical arm system state space model based on the mechanical arm joint angle state information and end position state information;

S3. obtaining a state characteristic matrix set and an action characteristic matrix set of mechanical arm motion based on the mechanical arm system state space model and characteristic information;

S4, obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;

S5. obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation.

The embodiment of the present disclosure applies an imitation learning mechanism to a robot learning system, under the framework of the imitation learning mechanism, to train and learn by transmitting demonstrative information generated from the mechanical arm to a series-parallel multi-layer BP neural network representing a motion strategy. The correspondence between a state characteristic matrix set of the motion and an action characteristic matrix set of the motion is learned, to reproduce the demonstrative action, and generalize the actions and behaviors, so that when facing different tasks, the embodiment does not need to carry out action planning separately, thereby achieving high intelligence.

The steps are described in detail below:

It should be noted that, in this embodiment of the present disclosure, information collection is by sensors, e.g., task-related information during demonstration can be collected by lidar sensors and infrared sensors on the mechanical arm.

Step S1, dividing a three-dimensional space based on a workspace requirement of a robot mechanical arm and obtaining mechanical arm joint angle state information, end position state information and characteristic information in the three-dimensional space during demonstration, may include, specifically:

S101. based on a specified reachable range of the mechanical arm, dividing an actual three-dimensional space into M regions in a direction that the robot faces, where a first motion joint, shoulder, is the coordinate origin, and an end point S of the mechanical arm is draggable within the M regions to demonstrate reach at a target point. It should be noted that, in this embodiment of the present disclosure, the three-dimensional space is divided into eight regions, namely I, II, III, IV, V, VI, VII and VIII, and the division is shown in FIG. 2.

S102. demonstrating by dragging the mechanical arm in the three-dimensional space, and obtaining mechanical arm joint angle state information, end position state information and characteristic information in the three-dimensional space during demonstration.

Figure 3:
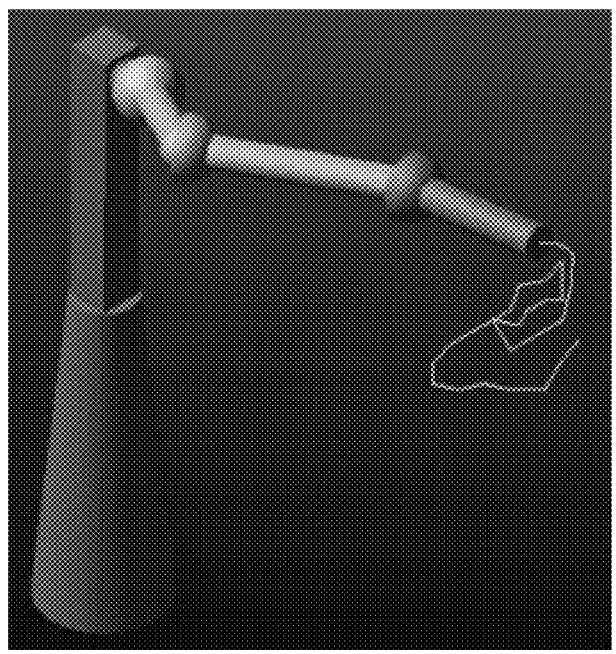
FIG. 3 is an exploded view of the joints of a mechanical arm according to an embodiment of the present disclosure.
Figure 4:
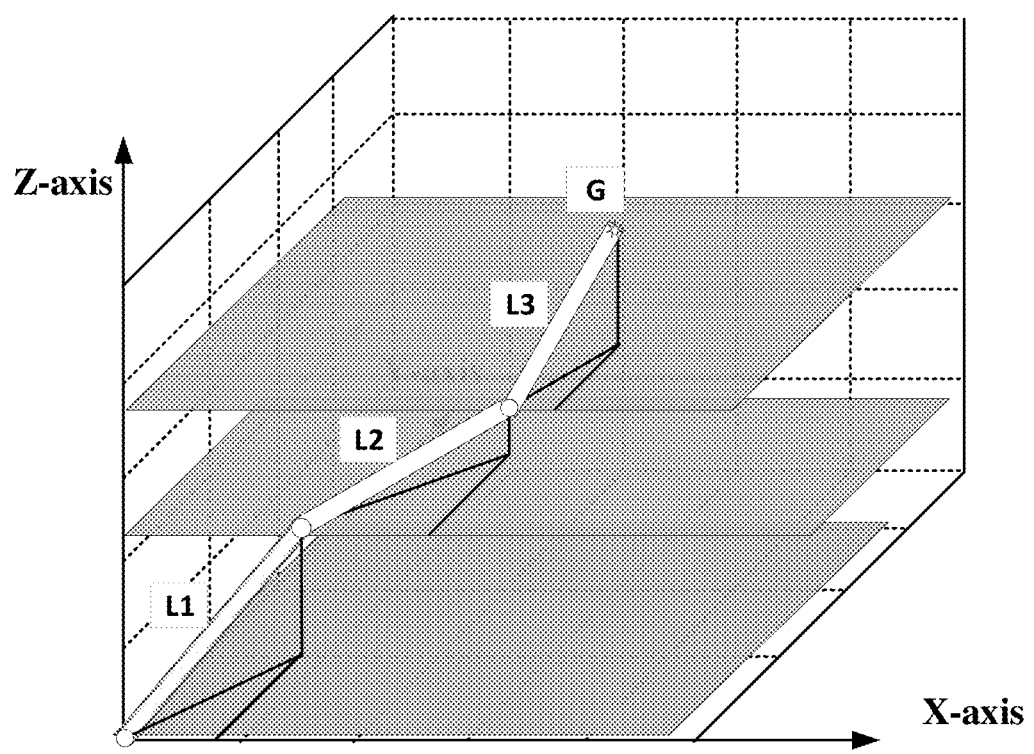
FIG. 4 illustrates a mechanical arm state space model according to an embodiment of the present disclosure.

In the embodiment of the present disclosure, the mechanical arm includes three joints and three connecting rods. The three joints include: shoulder (joint 1), elbow (joint 2) and wrist (joint 3); the three connecting rods include: connecting rod 1, connecting rod 2 and connecting rod 3. FIG. 3 illustrates a model of the mechanical arm. Mechanical arm system state variables include: mechanical arm angle variables, and mechanical arm end point position variables. The angle state of each joint angle of the mechanical arm is defined by three angles of the joint angle in the directions x, y and z, respectively, in the three-dimensional space; therefore, this kind of state variable has nine state parameters. The end position state of the mechanical arm is defined by three coordinates of the end point S in the directions x, y and z in the three-dimensional coordinate system; therefore, this kind of state variable has three state parameters. FIG. 4 illustrates the decomposition of the mechanical arm joint angle states and end point position state.

The characteristic information includes mechanical arm system state characteristic information and environment state characteristic information. Specifically, the mechanical arm system state characteristic information includes: angle state characteristic $\theta_{ij}$ of each current joint angle of the mechanical arm, and position state characteristic $S_k$ of the end point of the mechanical arm. The environment state characteristic information includes: position state characteristic $G_k$ of a demonstrative-task target point, where $G_k$ denotes the coordinate of a point G in direction k.

It should be noted that, in the embodiment of the present disclosure, assuming the above three characteristics ($\theta_{ij}$, $S_k$, $G_k$) have P, Q and R characteristic parameters, respectively, the characteristic matrix set $v=[v_1, v_2, \ldots, v_s, \ldots, v_S]$ has P+Q+R characteristic parameters, where $v_s$ denotes an sth characteristic parameter, and the first P characteristic parameters in the characteristic matrix set v are the angle state characteristic parameters of the joint angles of the mechanical arm; the (P+1)th to (P+Q)th characteristic parameters are the mechanical arm end point position state characteristic parameters; the (P+Q+1)th to (P+Q+R)th characteristic parameters are the position state characteristic parameters of the target point, s=1, 2, ..., S, S=P+Q+R. In the embodiment of the present disclosure, the angle state characteristic parameters of the joint angles of the mechanical arm include: the angles of the first joint angle in the directions x, y and z; the angles of the second joint angle in the directions x, y and z; and the angles of the third joint angle in the directions x, y and z, that is, P=3+3+3=9. The mechanical arm end point position state characteristic parameters include: the coordinates of the end point S of the mechanical arm in the directions x, y and z, that is, Q=3. The position state characteristic parameters of the target point include: the coordinates of the demonstrative-task target point G in the directions x, y and z, that is, R=3.

Step S2, setting up a mechanical arm system state space model based on the mechanical arm joint angle state information and end position state information, may include, specifically:

Because tasks performed by a robot mechanical arm can be described directly and conveniently with the mechanical arm end position, and because the spatial position and motion state of a fixed-length mechanical arm are determined by the angle of rotation of the joint, the mechanical arm system state space model can be expressed with the mechanical arm joint angle state variables and the mechanical arm end point position state variables, in the following expression:

$$\xi_t=(\theta_{ij}, S_k),$$

where $\theta_{ij}$ denotes the angle of a joint angle i in the direction j;
$S_k$ denotes the coordinate of a point S in the direction k.

Step S3, obtaining a state characteristic matrix set and an action characteristic matrix set of mechanical arm motion based on the mechanical arm system state space model and characteristic information, may include, specifically:

S301. constructing a characteristic matrix set with selected characteristic parameters from the task-related characteristic information, and preprocessing the characteristic matrix set. The preprocessing includes:

calculating an action characteristic parameter of the mechanical arm according to Equation (1):

$$\alpha_{ijt}=\theta_{ijt+1}-\theta_{ijt} \quad (1)$$

where $\theta_{ijt+}$ is the angle of a joint angle i in the direction j at time t+1, $\theta_{ijt}$ is the angle of the joint angle i in the direction j at time t, $\alpha_{ijt}$ is the angle that the joint angle i rotates in the direction j at time t;

calculating a state characteristic parameter of the mechanical arm relative to a target point according to Equation (2):

$$D_{kt}=S_{kt}-G_{kt} \quad (2)$$

where $S_{kt}$ is the coordinate of the end point S of the mechanical arm in the direction k at time t, $G_{kt}$ is the coordinate of the target point G in the direction k at time t, $D_{kt}$ is the relative displacement of the end point S of the mechanical arm with respect to the target point G in the direction k at time t.

S302. obtaining a state characteristic matrix set and an action characteristic matrix set of mechanical arm motion based on the preprocessed characteristic matrix set. Specifically, Task-related action characteristics of mechanical arm motion are the angle of rotation characteristics of the mechanical arm joint angles, and hence the action characteristic matrix set of mechanical arm motion is $\alpha_{ijt}=[\alpha_{ij}]_t$.

Task-related state characteristics of mechanical arm motion include: mechanical arm joint angle state characteristics, and mechanical arm end-point-to-target-point displacement state characteristics, and the hence the state characteristic matrix set of mechanical arm motion is $\zeta_t=[(\theta_{ij}, D_k]_t$.

In the embodiment of the present disclosure, task-related action characteristic parameters of mechanical arm motion include: the angles that the first joint angle rotates in the directions x, y and z at time t; the angles that the second joint angle rotates in the directions x, y and z at time t; the angles that the third joint angle rotates in the directions x, y and z at time t. The action characteristic matrix set is expressed as:

$$\alpha_{ijt}=[\alpha_{11},\alpha_{12},\alpha_{13},\alpha_{21},\alpha_{22},\alpha_{23},\alpha_{31},\alpha_{32},\alpha_{33}]_t$$

where $\alpha_{11}$, $\alpha_{12}$, $\alpha_{13}$ are action characteristic parameters of the first joint angle; $\alpha_{21}$, $\alpha_{22}$, $\alpha_{23}$ are action characteristic parameters of the second joint angle; $\alpha_{31}$, $\alpha_{32}$, $\alpha_{33}$ are action characteristic parameters of the third joint angle.

Task-related state characteristic parameters of mechanical arm motion include: the angles of the first joint angle of the mechanical arm in the directions x, y and z at time t; the angles of the second joint angle of the mechanical arm in the directions x, y and z at time t; the angles of the third joint angle of the mechanical arm in the directions x, y and z at time t; the displacements of the end point of the mechanical arm with respect to the target point in the directions x, y and z at time t. The state characteristic matrix set is expressed as:

$$\zeta_t=[\theta_{11},\theta_{12},\theta_{13},\theta_{21},\theta_{22},\theta_{23},\theta_{31},\theta_{32},\theta_{33},D_x,D_y,D_z]_t$$

where $\theta_{11}$, $\theta_{12}$, $\theta_{13}$ are angle state characteristic parameters of the first joint angle; $\theta_{21}$, $\theta_{22}$, $\theta_{23}$ are angle state characteristic parameters of the second joint angle; $\theta_{31}$, $\theta_{32}$, $\theta_{33}$ are angle state characteristic parameters of the third joint angle; $D_x$, $D_y$, $D_z$ are relative displacement state characteristic parameters of the end point of the mechanical arm with respect to the target point.

Step S4, obtaining a series-parallel multi-layer BP neural network model for action imitation learning by training a pre-built series-parallel multi-layer BP neural network model based on the state characteristic matrix set and action characteristic matrix set of mechanical arm motion, may include, specifically:

In the embodiment of the present disclosure, the pre-built series-parallel multi-layer BP neural network model includes an input layer, a hidden layer and an output layer. Specifically, the input layer contains S nodes, the output layer contains T nodes and the hidden layer contains C nodes. The number C of hidden-layer nodes is calculated according to Equation (3):

$$C=\lceil\sqrt{S+T}+a\rceil \quad (3)$$

where

T is the number of output-layer nodes, S is the number of input-layer nodes, a is an adjustment constant, $0\leq a\leq 10$, and $\lceil\cdot\rceil$ is a round-down function.

In the embodiment of the present disclosure, the mechanical arm has three joint angles and moves in a three-dimensional space, and there are nine (3×3) joint angle state characteristic parameters and three displacement state characteristic parameters of the end point of the mechanical arm with respect to the target point; therefore, the input layer contains S=12 nodes. The three joint angles of the mechanical arm move in a three-dimensional space, and there are nine (3×3) action characteristic parameters of the mechanical arm; therefore, the output layer contains T=9 nodes.

Figure 5:
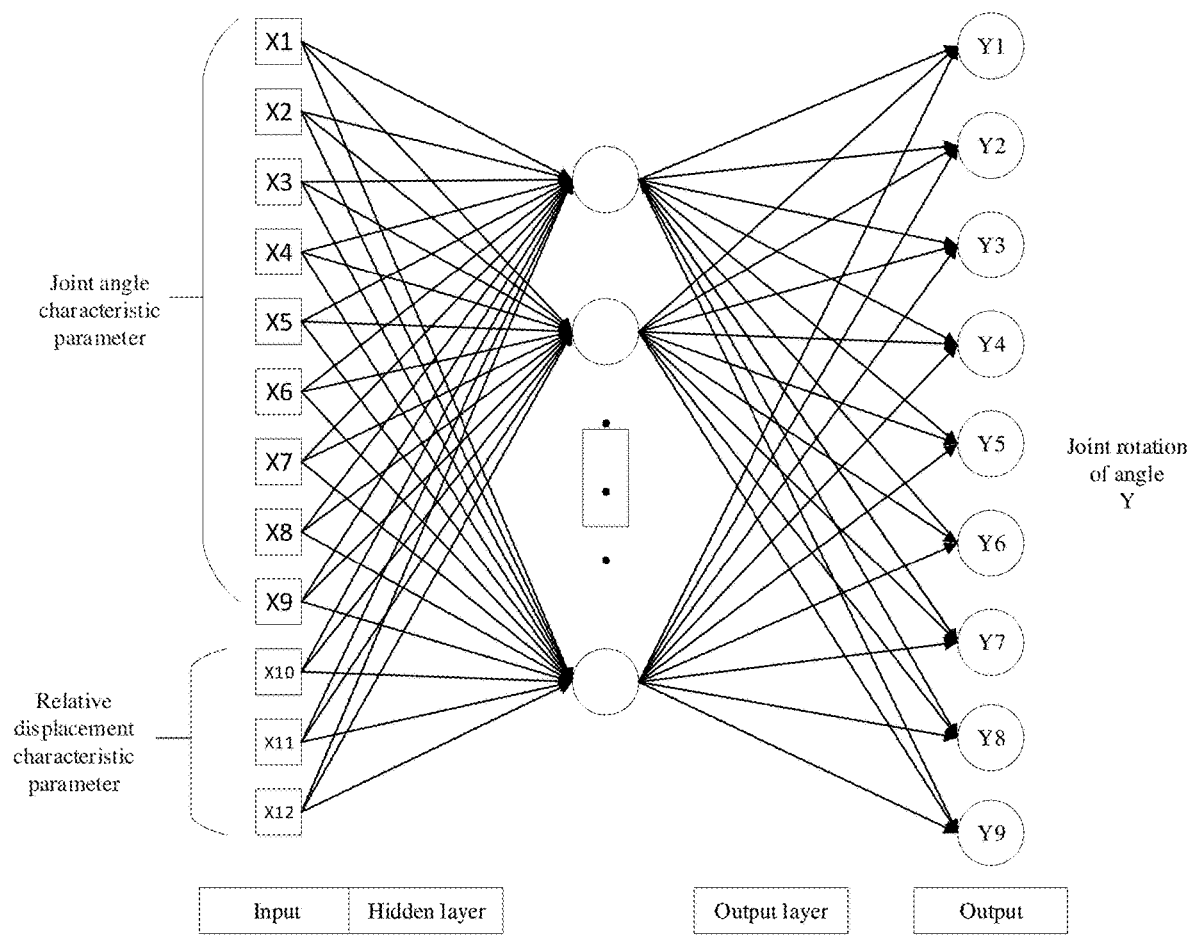
FIG. 5 is a structural diagram of a pre-built series-parallel multi-layer BP neural network model according to an embodiment of the present disclosure.

In practice, the adjustment constant may be determined so that the number of hidden-layer nodes is between the number of input-layer nodes and the number of output-layer nodes. In an embodiment of the present disclosure, a=6. Because the number of input-layer nodes is 12 and the number of output-layer nodes is 9, the number of hidden-layer nodes is calculated to be 10. FIG. 5 is a structural diagram of the pre-built series-parallel multi-layer BP neural network model.

S401. obtaining input state samples $X=[X_1, X_2, \ldots X_n, \ldots, X_N]$ and expected output action samples $Y=[Y_1, Y_2, \ldots Y_n, \ldots, Y_N]$ at a corresponding time from the state characteristic matrix set and the action characteristic matrix set, where X is an nth input sample, and the nth input sample $X_n$ matrix contains P joint angle state parameters and Q relative displacement state parameters, totaling L parameters, denoted as $X_n=[x_1^n, x_2^n, \ldots, x_l^n, \ldots, x_L^n]^T$, where $x_l^n$ is an lth input parameter of the nth input sample; $Y_n$ is the expected output action result sample for the nth input sample $X_n$, $Y_n$ contains P joint angle of rotation action result parameters, denoted as $Y_n=[y_1^n, y_2^n, L, y_p^n, L, y_P^n]^T$, where $Y_p^n$ is a pth expected output result parameter for the nth sample, $1\leq n\leq N$.

In practice, a standard number of samples may be selected from each of the eight spatial regions (I, II, III, IV, V, VI, VII and VIII), the sample size for each region should ensure effective training while being kept as little as possible.

S402. randomly selecting k input samples $(X_1, X_2, X_3, \ldots, X_k)$ from the samples, as the input samples for an mth training, where m is the number of trainings and is initialized as m=1;

S403. obtaining an output value up of a pth node in the hidden layer of a kth training sample in the mth training according to Equation (4), to obtain a hidden-layer node output value matrix $u_k=[u_1^k, u_2^k, \ldots, u_p^k, \ldots, u_S^k]$ of the kth training sample in the mth training:

$$u_p^k=\omega_p^m\times X_k^T \quad (4)$$

where $\omega_p^m$ is a link weight coefficient matrix in the mth training between the pth node in the hidden layer and S starting nodes in the input layer, $\omega_p^m=[\omega_{p1}^m, \omega_{p2}^m, \ldots, \omega_{pj}^m, \ldots, \omega_{pS}^m]$; $\omega_{pj}^m$ denotes a link weight coefficient in the mth training between a jth input-layer node and the pth hidden-layer node; $X_k^T$ is the transpose of the kth training sample.

S404. calculating an output value $y_q^k$ of a qth node in the output layer of the kth training sample in the mth training according to Equation (5), to obtain an output-layer node output value matrix $y_k=[y_1^k, y_2^k, \ldots, y_q^k, \ldots, y_T^k]$ of the kth training sample in the mth training:

$$y_q^k=a^m+\lambda_q^m\times u_k^T+\varphi_q^m\times X_k^T \quad (5)$$

where $a^m$ is a bias term matrix of q nodes in the output layer in the mth training, $a^m=[a_1^m, s_2^m, \ldots, a_q^m, \ldots, a_T^m]^T$, $\lambda_q^m$ is a link weight coefficient matrix in the mth training between the qth node in the output layer and C nodes in the hidden layer, $\lambda_q^m=[\lambda_{q1}^m, \lambda_{q2}^m, \ldots, \lambda_{qp}^m, \ldots, \lambda_{qC}^m]$; $\lambda_{qp}^m$ denotes a link weight coefficient in the mth training between a pth hidden-layer node and the qth output-layer node; $\varphi_q^m$ is a link weight coefficient matrix in the mth training between the qth node in the output layer and S nodes in the input layer, $\varphi_q^m=[\varphi_{q1}^m, \varphi_{q2}^m, \ldots, \varphi_{qj}^m, \ldots, \varphi_{qS}^m]$; $\varphi_{qj}^m$ denotes a link weight coefficient in the mth training between a jth input-layer node and the qth output-layer node; $X_k^T$ is the transpose of the kth training sample.

S405. calculating a mean-square error (MSE) between output results of the output-layer nodes in the mth training and expected output results of an mth group of input samples $(X_1, X_2, X_3, \ldots, X_k)$ according to Equation (6):

$$MSE=\frac{1}{C}\frac{1}{k}\sum_{k=1}^{k}\sum_{i=1}^{C}(Y_i'^k-Y_i^k)^2 \quad (6)$$

where

C denotes the number of output nodes, k denotes the number of training samples, $Y_i'^k$ denotes the actual output value, $Y_i^k$ denotes the expected output.

S406. If $MSE_m>\varepsilon$, maintaining the link weight coefficients and bias terms, and executing step S407; if $MSE_m\leq\varepsilon$, executing step S408, where $\varepsilon$ is a specified error accuracy, and $\varepsilon=0.02$ in the embodiment of the present disclosure.

S407. correcting according to Equation (7), to obtain a corrected link weight coefficient $\omega'_{pj}^m$ between a pth hidden-layer node and a jth input-layer node in the mth a corrected link weight coefficient $\lambda'_{qp}^m$ between a qth output-layer node and a pth hidden-layer node in the mth training, a corrected link weight coefficient $\varphi'_{qj}^m$ between a qth output-layer node and a jth input-layer node in the mth training, a corrected bias term $a'_q^m$ between a qth output-layer node and the hidden-layer nodes in the mth training:

$$\begin{cases} \omega'^m_{pj} = \omega^m_{pj} - \rho\alpha\dfrac{\partial E_m}{\partial w^m_{pj}} \\ \lambda'^m_{qp} = \lambda^m_{qp} - \rho\beta\dfrac{\partial E_m}{\partial \lambda^m_{qp}} \\ \varphi'^m_{qj} = \varphi^m_{qj} - \rho\gamma\dfrac{\partial E_m}{\partial \varphi^m_{qj}} \\ a'^m_q = a^m_q - \rho\delta\dfrac{\partial E_m}{\partial a^m_q} \end{cases} \quad (7)$$

where

α, β, γ and δ are learning strides, and ρ is a stride coefficient. In an embodiment of the present disclosure, the learning strides may be optimized so that the pre-built series-parallel multi-layer BP neural network model changes the iteration rate according to a change in the error when samples are given, so as to meet error requirements.

The stride coefficient can be calculated according to Equation (8):

$$\begin{cases} \rho = 1 & \varepsilon \le E_n < 2\varepsilon \\ \rho = \dfrac{E_n}{\varepsilon} & 2\varepsilon \le E_n < 10\varepsilon ; \\ \rho = 10 & 10\varepsilon \le E_n \end{cases} \quad (8)$$

It should be noted that the embodiment of the present disclosure adopts a modified series-parallel multi-layer neural network, where fixed learning coefficients have been modified into learning strides and a stride coefficient, and the stride coefficient changes as the error changes. The larger the error, the larger the stride coefficient; the smaller the error, the smaller the stride coefficient. As a result, the farther the iteration is from the optimization point, the faster the rate; the closer the iteration is to the optimization point, the slower the rate.

S408, assigning $\omega'^m_{pj}$ to $\omega^m_{pj}$; assigning $\lambda'^m_{qp}$ to $\lambda A^m_{qp}$; assigning $\varphi'^m_{qj}$ to $\varphi^m_{qj}$; assigning $a'^m_q$ to $a^m_q$;

S409. assigning m+1 to m, and judging whether m>M, where M is a specified number of training iterations, if so, determining that a link weight coefficient $\omega^m_{pj}$ between a jth input-layer node and a pth hidden-layer node in the mth training, a bias term $a^M_q$ of a qth output-layer node in the mth training, a link weight coefficient $\lambda^M_{qp}$ between a pth hidden-layer node and a qth output-layer node in the mth training and a link weight coefficient $\varphi^M_{qj}$ between a jth input-layer node and a qth output-layer node in the mth training are obtained, and determining them as the optimal link weight coefficients $\Omega_{pj}^*$, $\lambda_{qp}^*$ and $\varphi_{aj}^*$ and bias term $a_q^*$; otherwise, returning to step S404.

S410. substituting with the optimal link weight coefficients and bias term in Equation (4) and Equation (5), and combining Equation (3), to obtain the series-parallel multi-layer BP neural network model for action learning:

$$C = \lceil \sqrt{S+T} + a \rceil$$

$$u_p^k = \omega_{pj}^* \times X_k^T$$

$$y_q^k = a_q^* + \lambda_{qp}^* \times u_k^T + \varphi_{qj}^* \times X_k^T$$

where

C is the number of hidden-layer nodes, T is the number of output-layer nodes, S is the number of input-layer nodes; a is an adjustment constant, 0≤a≤10; ⌈·⌉ is a round-down function; $u_p^k$ is an output value of a pth node in the hidden layer; $y_q^k$ is an output value of a qth node in the output layer;

$\omega_{pj}^*$, $\lambda_{qp}^*$ and $\varphi_{qj}^*$ are the optimal link weight coefficients; $a_q^*$ is the bias term; $X_k^T$ is the transpose of a kth training sample.

Step S5: obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation.

It should be noted that in practice, in order to determine whether the mechanical arm completes a target task, a completion degree parameter may be used. In an embodiment of the present disclosure, when the coordinates of a specified task target point O in the mechanical arm workspace are O (Ox, Oy, Oz), the completion degree parameter may be defined by the displacement between the end point of the mechanical arm and the target point in the current state. The completion degree parameter may be calculated according to the equation below:

$$DT = \sqrt{D_x^2 + D_y^2 + D_z^2}$$

where $D_x$, $D_y$, $D_z$ are relative displacements of the end point of the mechanical arm with respect to the target point in the directions x, y and z, respectively; DT is the completion degree parameter.

S501, obtaining in real time mechanical arm current state information and environment state information, extracting a mechanical arm angle characteristic from the mechanical arm state information, and distance characteristic information of the end point of the mechanical arm to the target point in the environmental state information, inputting the extracted characteristic matrix sets into the trained series-parallel multi-layer BP neural network model to obtain a mechanical arm action for the current state, that is, the joint angle of rotation for the mechanical arm to execute the action defined by the action characteristic matrix set. The robot executes the action, and collects state information and environment information when the action is completed for extraction of characteristic information.

Figure 6:
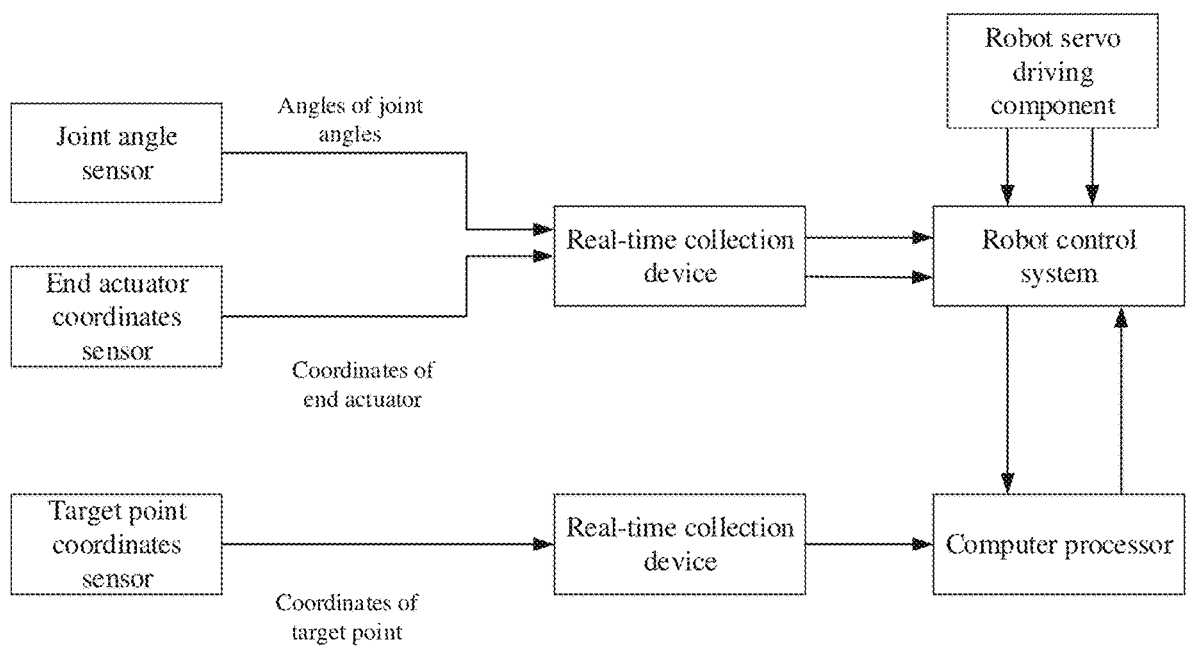
FIG. 6 is a block diagram of an information collection system according to an embodiment of the present disclosure.

It should be noted that, in an embodiment of the present disclosure, a sensor may collect joint angles of the mechanical arm and end coordinates of the actuator and transmit them to a robot control system controlled by a robot servo component. Target point coordinate information collected by a sensor may also be transmitted the same computer processor, which performs data processing to extract joint angle state characteristics and mechanical arm end-point-to-target-point displacement state characteristics to form a characteristic matrix set and input characteristic matrix set into the trained network, to obtain a mechanical arm joint angle of rotation action output for the current state. The mechanical arm executes the action, and collects current state information in real time and feeds it back to the robot control system. A specific process is shown in FIG. 6.

S502, determining whether the task is completed: if DT v, determining the task is completed; if DT>ψ, determining the task is not completed; when the task is not completed, returning to step S501, where ψ is a specified error accuracy, and in an embodiment of the present disclosure, ψ=0.1.

It should be noted that, in the embodiment of the present disclosure, a series-parallel multi-layer BP neural network model is obtained through steps S1 to S4. Once the series-parallel multi-layer BP neural network model is obtained, the steps S1 to S4 are no longer necessary; in subsequent application process, only step S5 is needed.

The present disclosure also provides a system for robot action imitation learning in a three-dimensional space, the system including a computer, and the computer including:
at least one storage unit;
at least one processing unit;
wherein the at least one storage unit is stored with at least one instruction, the at least one instruction is loadable and executable by the at least one processing unit to implement the steps of:

S1. dividing a three-dimensional space based on a workspace requirement of a robot mechanical arm; obtaining mechanical arm joint angle state information, end position state information and characteristic information in the three-dimensional space during demonstration;

S2, setting up a mechanical arm system state space model based on the mechanical arm joint angle state information and end position state information;

S3. obtaining a state characteristic matrix set and an action characteristic matrix set of mechanical arm motion based on the mechanical arm system state space model and characteristic information;

S4, obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;

S5. obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task.

Those skilled in the art understand that the system for robot action imitation learning in a three-dimensional space in this embodiment of the present disclosure corresponds to the above method for robot action imitation learning in a three-dimensional space; therefore, for explanations, examples and beneficial effects of the system, reference can be made to the corresponding contents in the above method, which are omitted here.

In summary, compared with the prior art, the embodiments of the present disclosure have the following beneficial effects:

1. The embodiments of the present disclosure apply an imitation learning mechanism to a robot learning system, under the framework of the imitation learning mechanism, to train and learn by transmitting demonstrative information generated from a mechanical arm to a series-parallel multi-layer BP neural network representing a motion strategy. The correspondence between a state characteristic matrix set of the motion and an action characteristic matrix set of the motion is learned, to reproduce the demonstrative action, and generalize the actions and behaviors, so that when facing different tasks, the embodiments do not need to carry out action planning separately, thereby achieving high intelligence.

2. In an embodiment of the present disclosure, demonstration is done by dragging a humanoid three-joint multi-degree-of-freedom mechanical arm in the three-dimensional space; the spatially redundant multi-degree-of-freedom mechanical arm is more flexible and enables tasks in complex scenarios or of great difficulty, and more importantly, the joint motion agrees with human habits. Additionally, in an embodiment of the present disclosure, sensors are used to collect motion information data directly, which avoids the problem of low identification accuracy with using a camera to collect the motion information, and improves the accuracy of data collection.

3. In the method for robot action imitation learning in a three-dimensional space according to an embodiment of the present disclosure, various characteristics of the demonstrative information are collected and used to train a modified series-parallel multi-layer BP neural network, which optimizes the training process of the neural network and improves the generalization and speed while retaining the training accuracy compared with the traditional series-parallel multi-layer BP neural network. The embodiment can obtain mechanical arm motion information more quickly using sample information, and improve the autonomy of the motion.

It should be noted that, in the specification, relational terms such as first and second are used only to distinguish one entity or operation from another, and do not necessarily require or imply any such actual relationship or order between them. Moreover, the terms "include", "contain" or any other variation thereof are intended to indicate a non-exclusive inclusion such that a process, method, object or device that "includes" a set of elements includes not only those elements, but also other elements that are not explicitly listed, or also includes an element that is inherent to such process, method, object or device. Without further limitation, an element that is defined with the phrase "including an . . . " does not preclude the presence of other identical elements in the process, method, object or device including said element.

The present invention has been described in detail with reference to the embodiments; however, the embodiments are for illustrative purposes only and shall not be construed as liming the scope of the invention. Those skilled in the art should understand that modification or equivalents can be made to the technical solutions described herein without deviation from the spirit and scope of the present invention.

What is claimed is:

1. A method for robot action imitation learning in a three-dimensional space, comprising:
dividing a three-dimensional space based on a workspace requirement of a robot mechanical arm; obtaining mechanical arm joint angle state information, end position state information and characteristic information in the three-dimensional space during demonstration;
setting up a mechanical arm system state space model based on the mechanical arm joint angle state information and end position state information;
obtaining a state characteristic matrix set and an action characteristic matrix set of mechanical arm motion based on the mechanical arm system state space model and characteristic information;
obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;
obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task, so that the mechanical arm executes an action defined by the action characteristic matrix set of mechanical arm motion for the real-time target task through joint rotation.

2. The method for robot action imitation learning in a three-dimensional space according to claim 1, wherein the characteristic information comprises: mechanical arm system state characteristic information, and task-related environment information;

the mechanical arm system state characteristic information comprises: angle state information of each current joint angle of the mechanical arm, and position state information of an end point of the mechanical arm;

the task-related environment information comprises: position state information of a demonstrative-task target point in a spatial coordinate system.

3. The method for robot action imitation learning in a three-dimensional space according to claim 1, wherein the method further comprises, before the obtaining a state characteristic matrix set and an action characteristic matrix set of mechanical arm motion:

constructing a characteristic matrix set with selected characteristic parameters from the task-related characteristic information, and preprocessing the characteristic matrix set.

4. The method for robot action imitation learning in a three-dimensional space according to claim 3, wherein the task-related characteristic information comprises: mechanical arm system state characteristic information and environment state characteristic information;

the mechanical arm system state characteristic information comprises: angle state characteristic $\theta_{ij}$ of each current joint angle of the mechanical arm, and position state characteristic $S_k$ of the end point of the mechanical arm;

the environment state characteristic information comprises: position state characteristic $G_k$ of a demonstrative-task target point, where $G_k$ denotes the coordinate of the demonstrative-task target point G in direction k.

5. The method for robot action imitation learning in a three-dimensional space according to claim 4, wherein the preprocessing includes:

calculating an action characteristic parameter of the mechanical arm according to the equation below:

$$\alpha_{ijt} = \theta_{ijt+1} - \theta_{ijt}$$

where $\theta_{ijt+1}$ is the angle of a joint angle i in the direction j at time t+1, $\theta_{ijt}$ is the angle of the joint angle i in the direction j at time t, $\alpha_{ijt}$ is the angle that the joint angle i rotates in the direction j at time t;

calculating a state characteristic parameter of the mechanical arm relative to a target point according to the equation below:

$$D_{kt} = S_{kt} - G_{kt}$$

where $S_{kt}$ is the coordinate of the end point S of the mechanical arm in the direction k at time t, $G_{kt}$ is the coordinate of the target point G in the direction k at time t, $D_{kt}$ is the relative displacement of the end point S of the mechanical arm with respect to the target point G in the direction k at time t.

6. The method for robot action imitation learning in a three-dimensional space according to claim 1, wherein the pre-built series-parallel multi-layer BP neural network model comprises an input layer, a hidden layer and an output layer;

the input layer contains S nodes, the output layer contains T nodes and the hidden layer contains C nodes;

the number of hidden-layer nodes is calculated according to the equation below:

$$C = \lceil \sqrt{S+T} + a \rceil$$

where a is an adjustment constant, $0 \leq a \leq 10$; and $\lceil \cdot \rceil$ is a round-down function.

7. The method for robot action imitation learning in a three-dimensional space according to claim 1, wherein the obtaining a series-parallel multi-layer BP neural network model for action imitation learning comprises:

S401. obtaining input state samples $X=[X_1, X_2, X_n, \ldots, X_N]$ and expected output action samples $Y=[Y_1, Y_2, \ldots Y_n, \ldots, Y_N]$ at a corresponding time from the state characteristic matrix set and the action characteristic matrix set, where X is an nth input sample, and the nth input sample $X_n$ matrix contains P joint angle state parameters and Q relative displacement state parameters, totaling L parameters, denoted as $X_n = [x_1^n x_2^n, \ldots, x_l^n, \ldots, x_L^n]^T$, where $x_l^n$ is an lth input parameter of the nth input sample; $Y_n$ is the expected output action result sample for the nth input sample $X_n$, $Y_n$ contains P joint angle of rotation action result parameters, denoted as $Y_n, [y_1^n, y_2^n, L, y_p^n, L, y_P^n]^T$, where $Y_p^n$ is a pth expected output result parameter for the nth sample, $1 \leq n \leq N$;

S402. randomly selecting k input samples $(X_1, X_2, X_3, \ldots, X_k)$ from the samples, as the input samples for an mth training, where m is the number of trainings and is initialized as m=1;

S403. obtaining an output value $u_p^k$ of a pth node in the hidden layer of a kth training sample in the mth training according to the equation below, to obtain a hidden-layer node output value matrix $u_k = [u_1^k, u_2^k, \ldots, u_p^k, \ldots, u_S^k]$ of the kth training sample in the mth training:

$$u_p^k = \omega_p^m \times X_k^T$$

where $\omega_p^m$ is a link weight coefficient matrix in the mth training between the pth node in the hidden layer and S starting nodes in the input layer, $\omega_p^m = [\omega_{p1}^m, \omega_{p2}^m, \ldots, \omega_{pj}^m, \ldots, \omega_{pS}^m]$; $\omega_{pj}^m$ denotes a link weight coefficient in the mth training between a jth input-layer node and the pth hidden-layer node; $X_k^T$ is the transpose of the kth training sample;

S404. calculating an output value $y_q^k$ of a qth node in the output layer of the kth training sample in the mth training according to the equation blow, to obtain an output-layer node output value matrix $y_k = [y_1^k, y_2^k, \ldots, y_q^k, \ldots, y_T^k]$ of the kth training sample in the mth training:

$$y_q^k = a^m + \lambda_q^m \times u_k^T + \varphi_q^m \times X_k^T$$

where $a^m$ is a bias term matrix of q nodes in the output layer in the mth training, $a^m = [a_1^m, a_2^m, \ldots, a_q^m, \ldots, a_T^m]^T$;

$\lambda_q^m$ is a link weight coefficient matrix in the mth training between the qth node in the output layer and C nodes in the hidden layer, $\lambda_q^m = [\lambda_{q1}^m, \lambda_{q2}^m, \ldots,$ $\lambda_{qp}{}^m, \ldots, \lambda_{qC}{}^m]$; $\lambda_{qp}{}^m$ denotes a link weight coefficient in the mth training between a pth hidden-layer node and the qth output-layer node; $\varphi_q{}^m$ is a link weight coefficient matrix in the mth training between the qth node in the output layer and S nodes in the input layer, $\varphi_q{}^m = [\varphi_{q1}{}^m, \varphi_{q2}{}^m, \ldots, \varphi_{qj}{}^m, \ldots, \varphi_{qS}{}^m]$; $\varphi_{qj}{}^m$ denotes a link weight coefficient in the mth training between a jth input-layer node and the qth output-layer node; $X_k{}^T$ is the transpose of the kth training sample;

S405. calculating a mean-square error (MSE) between output results of the output-layer nodes in the mth training and expected output results of an mth group of input samples $(X_1, X_2, X_3, \ldots, X_k)$ according to the equation below:

$$MSE = \frac{1}{C}\frac{1}{k}\sum_{k=1}^{k}\sum_{i=1}^{C}(Y_i'^k - Y_i^k)^2$$

where
C denotes the number of output nodes, k denotes the number of training samples, $Y_i'^k$ denotes the actual output value, $Y_i^k$ denotes the expected output;

S406. if $MSE_m > \vartheta$, where ε is a specified error accuracy, maintaining the link weight coefficients and bias terms, and executing step S407; otherwise, step S408;

S407. correcting the link weight coefficients and bias terms, to obtain a corrected link weight coefficient $\omega'_{pj}{}^m$ between a pth hidden-layer node and a jth input-layer node in the mth training, a corrected link weight coefficient $\lambda'_{qp}{}^m$ between a qth output-layer node and a pth hidden-layer node in the mth training, a corrected link weight coefficient $\varphi'_{qj}{}^m$ between a qth output-layer node and a jth input-layer node in the mth training, a corrected bias term $a'_q{}^m$ between a qth output-layer node and the hidden-layer nodes in the mth training, where the correction is done according to the equation below:

$$\begin{cases} \omega'^m_{pj} = \omega^m_{pj} - \rho\alpha\frac{\partial E_m}{\partial w^m_{pj}} \\ \lambda'^m_{qp} = \lambda^m_{qp} - \rho\beta\frac{\partial E_m}{\partial \lambda^m_{qp}} \\ \varphi'^m_{qj} = \varphi^m_{qj} - \rho\gamma\frac{\partial E_m}{\partial \varphi^m_{qj}} \\ a'^m_q = a^m_q - \rho\delta\frac{\partial E_m}{\partial a^m_q} \end{cases}$$

where
α, β, γ and δ are learning strides, and ρ is a stride coefficient;
the stride coefficient is calculated according to the equation below:

$$\begin{cases} \rho = 1 & \varepsilon \le E_n < 2\varepsilon \\ \rho = \frac{E_n}{\varepsilon} & 2\varepsilon \le E_n < 10\varepsilon \\ \rho = 10 & 10\varepsilon \le E_n \end{cases}$$

S408. assigning $\omega'_{pj}{}^m$ to $\omega_{pj}{}^m$; assigning $\lambda'_{qp}{}^m$ to $\lambda_{qp}{}^m$; assigning $\varphi'_{qj}{}^m$ to $\varphi_{qj}{}^m$; assigning $a'_q{}^m$ to $a_q{}^m$;

S409. assigning m+1 to m, and judging whether m>M, where M is a specified number of training iterations, if so, determining that optimal link weight coefficients $\omega_{pj}^*$, $\lambda_{qp}^*$; and $\varphi_{qj}^*$ and bias term $a_q^*$ are obtained; otherwise, returning to step S404;

S410. substituting with the optimal link weight coefficients and bias term in the equations in steps S403 and S404, and combining the equation for calculating the number of hidden-layer nodes, to obtain the series-parallel multi-layer BP neural network model:

$$C = \lceil \sqrt{S+T} + a \rceil$$

$$u_q^k = \omega_{pj}^* \times X_k^T$$

$$y_q^k = a_q^* + \lambda_{qp}^* \times u_k^T + \varphi_{qj}^* \times X_k^T$$

where
C is the number of hidden-layer nodes, T is the number of output-layer nodes, S is the number of input-layer nodes;
a is an adjustment constant, 0≤a≤10;
$\lceil \cdot \rceil$ is a round-down function;
$u_p^k$ is an output value of a pth node in the hidden layer;
$y_q^k$ is an output value of a qth node in the output layer;
$\omega_{pj}^*$, $\lambda_{qp}^*$ and $\varphi_{qj}^*$ are the optimal link weight coefficients;
$a_q^*$ is the bias term;
$X_k^T$ is the transpose of a kth training sample.

8. The method for robot action imitation learning in a three-dimensional space according to claim 1, wherein the obtaining a state characteristic matrix set of mechanical arm motion for a real-time target task comprises:
obtaining in real time mechanical arm current state information and environment state information, extracting a mechanical arm angle characteristic from the mechanical arm state information, and distance characteristic information of the end point of the mechanical arm to the target point in the environmental state information, to obtain the state characteristic matrix set of mechanical arm motion for a real-time target task.

9. The method for robot action imitation learning in a three-dimensional space according to claim 1, wherein the method further comprises, after the executing an action defined by the action characteristic matrix set: determine whether the mechanical arm completes the target task; the determination comprises:
calculating a displacement between the end point of the mechanical arm and the target point in the current state, according to the equation below:

$$DT = \sqrt{D_x^2 + D_y^2 + D_z^2}$$

where $D_x$, $D_y$, $D_z$ are relative displacements of the end point of the mechanical arm with respect to the target point in the directions x, y and z, respectively; DT is the displacement between the end point of the mechanical arm and the target point in the current state;
comparing DT with a predetermined error accuracy w,
if DT≤ψ, determining the target task is completed;
if DT>ψ, determining the task is not completed; when the task is not completed, re-obtaining a state characteristic matrix set of mechanical arm motion for the real-time target task.

10. A system for robot action imitation learning in a three-dimensional space, comprising a computer, the computer comprising:
at least one storage unit;
at least one processing unit;

wherein the at least one storage unit is stored with at least one instruction, the at least one instruction is loadable and executable by the at least one processing unit to implement the steps of:

dividing a three-dimensional space based on a workspace requirement of a robot mechanical arm;

obtaining mechanical arm joint angle state information, end position state information and characteristic information in the three-dimensional space during demonstration;

setting up a mechanical arm system state space model based on the mechanical arm joint angle state information and end position state information;

obtaining a state characteristic matrix set and an action characteristic matrix set of mechanical arm motion based on the mechanical arm system state space model and characteristic information;

obtaining a series-parallel multi-layer backpropagation (BP) neural network model for action imitation learning based on the state characteristic matrix set of mechanical arm motion, the action characteristic matrix set of mechanical arm motion and a pre-built series-parallel multi-layer BP neural network model;

obtaining a state characteristic matrix set of mechanical arm motion for a real-time target task, and obtaining an action characteristic matrix set of mechanical arm motion for the real-time target task based on the series-parallel multi-layer BP neural network model and the state characteristic matrix set of mechanical arm motion for the real-time target task.

* * * * *